United States Patent
Lin et al.

(10) Patent No.: US 10,110,837 B2
(45) Date of Patent: Oct. 23, 2018

(54) METHOD AND APPARATUS FOR DATA TRANSMISSION IN AN IMAGE SENSOR

(71) Applicant: OMNIVISION TECHNOLOGIES, INC., Santa Clara, CA (US)

(72) Inventors: Yingkan Lin, San Jose, CA (US);
Tiejun Dai, Santa Clara, CA (US);
Cheng-Pin Lin, Saratoga, CA (US);
Yu-Shen Yang, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/446,711

(22) Filed: Mar. 1, 2017

(65) Prior Publication Data
US 2018/0255255 A1  Sep. 6, 2018

(51) Int. Cl.
| H04N 5/357 | (2011.01) |
| H04N 5/376 | (2011.01) |
| H04N 5/907 | (2006.01) |
| H04N 5/378 | (2011.01) |

(52) U.S. Cl.
CPC .......... *H04N 5/3577* (2013.01); *H04N 5/378* (2013.01); *H04N 5/3765* (2013.01); *H04N 5/907* (2013.01)

(58) Field of Classification Search
CPC ...... H04N 5/3577; H04N 5/907; H04N 5/378; H04N 5/3765
See application file for complete search history.

(56) References Cited

U.S. PATENT DOCUMENTS

| 8,031,233 | B2 | 10/2011 | Mabuchi |
| 9,294,703 | B2 | 3/2016 | Choo et al. |
| 2008/0294050 | A1* | 11/2008 | Shinomura ............... A61B 8/00 600/459 |
| 2009/0085616 | A1* | 4/2009 | Wada ..................... H03K 5/135 327/117 |
| 2012/0007653 | A1* | 1/2012 | Choo ................. H03K 5/15093 327/400 |
| 2015/0144771 | A1* | 5/2015 | Hagihara ............... H04N 5/378 250/208.1 |
| 2015/0304583 | A1* | 10/2015 | Lee .......................... H04N 5/76 348/300 |

* cited by examiner

*Primary Examiner* — Gevell Selby
(74) *Attorney, Agent, or Firm* — Christensen O'Connor Johnson Kindness PLLC

(57) ABSTRACT

Methods and apparatuses for data transmission in an image sensor are disclosed herein. An example data transmission circuit may include a plurality of transmission banks coupled in series with a first one of the plurality of transmission banks coupled to function logic, where each of the plurality of transmission banks are coupled to provide image data to a subsequent transmission bank in a direction toward the function logic in response to a clock signal, a plurality of delays coupled in series, wherein each of the plurality of delays is associated with and coupled to a respective transmission bank of the plurality of transmission banks, and wherein the clock signal is received by each of the plurality of transmission banks after being delayed by a respective number of delays of the plurality of delays in relation to the function logic.

18 Claims, 5 Drawing Sheets

METHOD AND APPARATUS FOR DATA TRANSMISSION IN AN IMAGE SENSOR

TECHNICAL FIELD

This disclosure relates generally to image sensors, and in particular but not exclusively, relates to data transmission in an image sensor.

BACKGROUND INFORMATION

Image sensors have become ubiquitous. They are widely used in digital still cameras, cellular phones, security cameras, as well as, medical, automobile, and other applications. The technology used to manufacture image sensors has continued to advance at a great pace. For example, the demands of higher resolution and lower power consumption have encouraged the further miniaturization and integration of these devices.

Many mobile devices, such as smartphones, have begun to introduce multiple antennae for the wireless transmission and reception. However, in some instances, one or more of the additional antennae may be placed in close proximity to an integrated image sensor. In general, the proximity of the antennae and the image sensor may be a non-issue, but due to certain operations, electromagnetic interference (EMI) generated in the antennae may be due to the image sensor. For example, the EMI may be due to large switching operations that occur in the image sensor due to movement of data from the pixel array to processing logic. As such, reduction or elimination of the EMI may be desirable.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1:
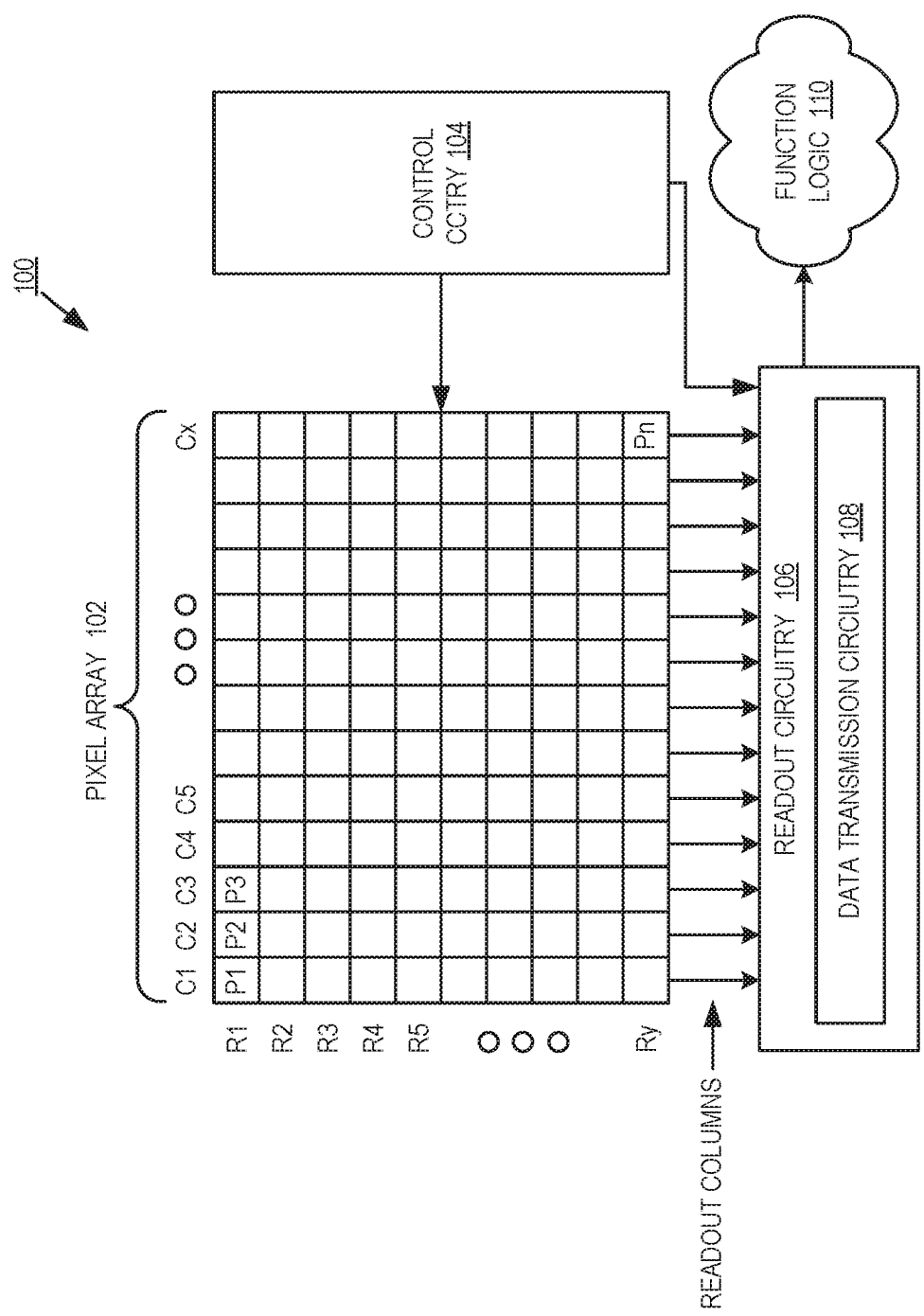
FIG. 1 illustrates one example of an imaging system 100 in accordance with an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method for data transmission within an image sensor are described herein. In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

FIG. 1 illustrates one example of an imaging system 100 in accordance with an embodiment of the present disclosure. Imaging system 100 includes pixel array 102, control circuitry 104, readout circuitry 106, and function logic 110. In one example, pixel array 102 is a two-dimensional (2D) array of photodiodes, or image sensor pixels (e.g., pixels P1, P2 . . . , Pn). As illustrated, photodiodes are arranged into rows (e.g., rows R1 to Ry) and columns (e.g., column C1 to Cx) to acquire image data of a person, place, object, etc., which can then be used to render a 2D image of the person, place, object, etc. However, photodiodes do not have to be arranged into rows and columns and may take other configurations.

In one example, after each image sensor photodiode/pixel in pixel array 102 has acquired its image data or image charge, the image data is readout by readout circuitry 106 and then transferred to function logic 110. Readout circuitry 106 may be coupled to readout image data from the plurality of photodiodes in pixel array 102. In various examples, readout circuitry 106 may include amplification circuitry, analog-to-digital (ADC) conversion circuitry, and data transmission circuitry 108. Function logic 110 may simply store the image data or even manipulate the image data by applying post image effects (e.g., crop, rotate, remove red eye, adjust brightness, adjust contrast, or otherwise). In some examples, control circuitry 104 and function logic 110 may be combined into a single functional block, and may control the capture of images along with the readout of image data from the readout circuitry 106 to the function logic 110. The function logic 110 may be a digital processor, for example. In one example, readout circuitry 106 may readout a row of image data at a time along readout column lines (illustrated) or may readout the image data using a variety of other techniques (not illustrated), such as a serial readout or a full parallel readout of all pixels simultaneously.

In one example, control circuitry 104 is coupled to pixel array 102 to control operation of the plurality of photodiodes in pixel array 102. For example, control circuitry 104 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows. In another example, image acquisition is synchronized with lighting effects such as a flash.

In one example, data transmission circuitry 108 may receive image data from ADCs, which convert the image data into digital representations of the same, and provide the digital representation of the image data to the function logic 110. In some embodiments, the data transmission circuitry 108 may receive the digital representations of the image data from the ADCs in parallel, and provide the same to the function logic 110 in series. The digital representations of the image data may be data words ranging from 11 to 13 bits, with 8 to 10 bits being associated with the image data and the remaining bits (two to three bits) being reserved for error correction. The error correction may be generated using any known error correction code (ECC), such as Hamming code, Reed-Solomon code, etc.

The image data received by the data transmission circuit 108 may comprise a row of data, less than a row of data, or more than a row of data, which may then be provided to the function logic 110 in series, as noted. However, instead of conventional data transmission techniques that provide the data over one or more conductors that have been precharged to a high logic level, for example, the data transmission circuitry 108 may comprise a plurality of banks configured to receive the image data in parallel, then provide their data sequentially to adjacent banks in a direction toward the function logic 110. The data may propagate through a series of latches that couple adjacent banks, and which are controlled by a common clock signal. The common clock signal may be delayed an amount respective to the bank in relation to the function logic 110. As such, instead of each latch of each of the plurality of banks operating simultaneously, each latch may operate one after another, such as in a wave-like pattern. The wave-like pattern and lack of precharge may reduce current load and electro-magnetic interference generation.

In one example, imaging system 100 may be included in a digital camera, cell phone, laptop computer, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
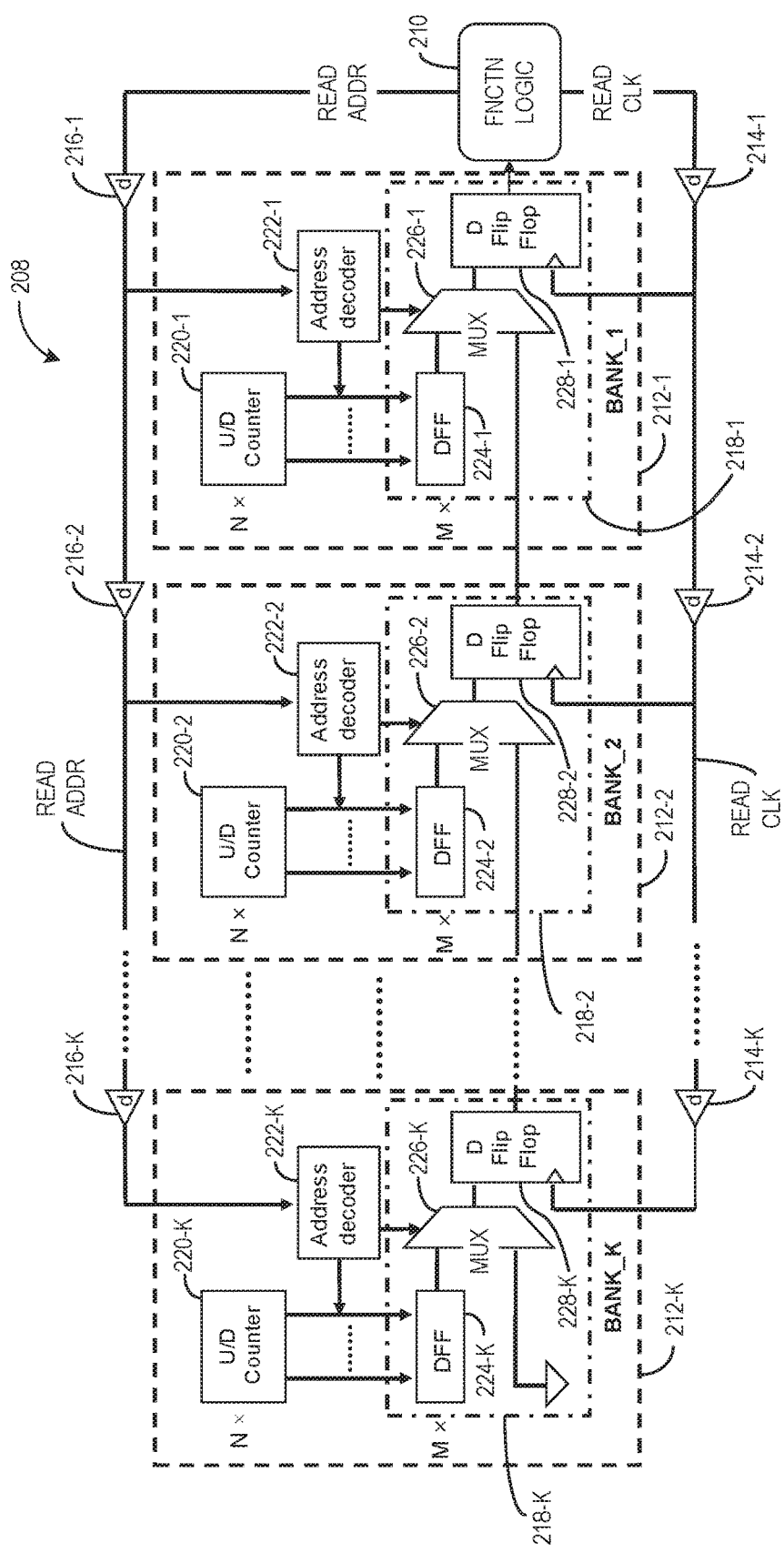
FIG. 2 is a data transmission circuit 208 in accordance with an embodiment of the present disclosure.

FIG. 2 is a data transmission circuit 208 in accordance with an embodiment of the present disclosure. The data transmission circuit 208 may be an example of the data transmission circuitry 108. The data transmission circuit 208 may receive image data from a pixel array, such as the pixel array 102, and serially provide the image data in turn. In some embodiments, the image data received by the data transmission circuit 208 may be in analog form, but the image data provided by the data transmission circuit 208 may be in digital form, e.g., data words representing image data from each pixel. However, the data transmission circuit 208 may otherwise receive the digital versions of the image data and provide the same in response. In some embodiments, the image data, e.g., the digital version, may be provided to function logic 210. Function logic 210 may be an example of the function logic 110 or a combination of the control circuitry 104 and the function logic 110.

The illustrated embodiment of the data transmission circuit 208 includes a plurality of banks 212 coupled to function logic 210, which provides a read address (READ ADDR) and a read clock (READ CLK) to the plurality of banks 212 via a plurality of delays 216 and 214, respectively. In some embodiments, there may be K number of banks, such as banks 212-1 through 212-K. For example, K may be 8 or 16, but other numbers of banks are also contemplated. The K banks may be coupled in series with a first one of the banks coupled to function logic 210. In general, image data may propagate through the plurality of banks to the function logic 210. In some embodiments, image data from bank 212-1, e.g., bank_1, may be provided to the function logic 210 first sequentially followed by data from banks 212-2 through 212-K, e.g., bank_2 through bank_K. Other than bank 212-1, data from each other bank 212 may propagate through all other interstitial banks 212 between it and the function logic 210. For example, image data from bank 212-K may propagate through banks 212-(K-1) through 212-1 before reaching function logic 210.

The illustrated embodiment of a bank 212 includes a plurality of channels 218, an address decoder 222, and a plurality of up/down counters (U/D Counter) 220. In some embodiments, there may be N up/down counters 220 and M channels 218, where the N represents the number of pixels the bank may receive image data from, and the M represents the number of channels. For each bank 212 there may be 8 or 16 channels, but other numbers of channel are contemplated herein. Image data of each bank 212 may be provided to a subsequent downstream bank 212 in response to at least the clock signal. As used herein, downstream may refer to movement of data toward the function logic 210. Because the plurality of banks 212 are coupled in series, image data propagates from an initial bank 212 through each interstitial bank 212 between it and the function logic 210. The propagation of the image data may be from one interface D flip flop 228 to a subsequent downstream interface D flip flop 228. The image data may move in a series of hops from interface D flip flop 228 to interface D flip flop 228 in response to a series of read clock signals.

The plurality of up/down counters 220 for each bank 212 may be or include ADC converters of associated readout circuitry, such as readout circuitry 106. While the up/down counters 220 are shown as part of the plurality of banks 212, the depiction is for ease of discussion and different implementations may be possible. For each bank 212, the plurality of up/down counters 220 may be a number N, so that each bank 212 receives image data from N pixels. In some embodiments, the addition of N up/down counters 220 for each bank 212 may equal a row of pixels of a pixel array, such as the pixel array 102. Each up/down counter 220 may convert image data received from a pixel into a digital representation of the same. For example, each up/down counter 220 may convert an analog voltage into a digital data word. The data word may be 8 or 9 bits to represent the image data, and 2 to 3 ECC bits may be appended after one or more ECC operations. As used herein, image data may be used to refer both to the analog and digital form, for sake of brevity.

The address decoder 222 may receive a delayed read address and provide control signals in response. In some embodiments, the control signals are provided to determine what image data to provide to one or more of the plurality of channels 218. In some embodiments, the read address determines a sequence of providing the N image data to the function logic 210. Additionally, the control signals control a multiplexer (MUX) 226 of the plurality of channels 218, which may cause the image data to be provided sequentially. In some embodiments, the read address may include up to eight bits, with a portion of the bits used to determine what image data to provide to which of the plurality of channels 218, and the remaining bits to control the MUX 226. As will be discussed below, the MUX 226 selects between image data of the present bank 212 and image data from the upstream adjacent bank 212. As used herein, upstream would refer to directions away from the function logic 210.

The illustrated embodiment of each of the plurality of channels 218 includes an internal D flip flop (DFF) 224, a MUX 226, and an interface D Flip Flop 228. Image data from one or more of the plurality of up/down counters 220 of a bank 212 may be provided to one or more channels 218 during a data transmission operation. In some embodiments, each channel 218 of the plurality of channels 218 may be provided a plurality of data words in response to a read address decoded by the address decoder 222. In other embodiments, only a single channel 218 may be used during a data transmission operation. Of course, other numbers of channels 218 may be used in parallel or series.

The internal DFF 224 of each channel 218 may receive image data from one or more of the plurality of up/down counters 220 in response to a control signal from the address counter 220. The image data may be latched by the internal DFF 224 so that it may be coupled to the MUX 226, and be ready to be provided to the interface D flip flop 228 in response to the MUX control signal from the address decoder 222. In some embodiments, the internal DFF 224 may be coupled to the plurality of up/down counters 220 via a multiplexer (not shown). In such an embodiment, the control signal provided by the address decoder 222 may determine which up/down counter 220 to couple to which channel 218.

The MUX 226 may be coupled to an output of the internal DFF 224 and an output of an upstream interface D flip flop 228. In response to a multiplexer control signal from the address decoder 222, the MUX 226 may couple either the output of the internal DFF 224 or the output of the upstream interface D flip flop 228 to an input of the associated internal D flip flop 228. The internal D flip flop 228 is coupled to latch image data from the associated channel 218 or from an upstream bank 212 in response to a read clock signal. Once the image data is latched, the image data is provided to a downstream MUX 226.

Additionally, each bank 212 receives the read address (READ ADDR) and the read clock (READ CLK) signals via a plurality of delays 216 and 214, respectively. For example, bank 212-1 receives the read address after being delayed a single time by delay 216-1, whereas bank_K receives the read address after being delayed K times due to delays 212-1 through 212-K. The same is true for the read clock signal. In general, the delay of each delay 214 and 216 may be very small, at least compared to a clock period. In some embodiments, the delay of each delay 214 and 216 may be a period of a system clock (not shown) divided by the number of banks 212, e.g., K. Delaying at least the read clock signal, accordingly, allows each interface D flip flop 228-1 through 228-K to latch data sequential instead of all at the same time. By sequentially triggering each interface D flip flop 228, the peak current is reduced, which reduces peak power consumption. Additionally, triggering the interface D flip flops 228 as such reduces the generation of electromagnetic interference since each they are not triggered concurrently.

In operation, the function logic 210, or the control circuitry 104, provides a read address signal and a read clock signal to the data transmission 208. In some embodiments, the two signals are provided concurrently. In other embodiments, the read address signal may be provided prior to the read clock signal so that the image data associated with the read address is ready before the read clock signal arrives. In response to the read address and read clock signals, one or more of the banks 212 provides image data to the function logic 210 via intervening bank 212. For example, if a channel 218 of bank 212-4 is targeted by the read address, then the image data may propagate to the function logic 210 via banks 212-3, 212-2, and 212-1 before arriving at the function logic 210. To move the data between banks 212, subsequent pulses of the read clock signal will trigger the movement of the image data from bank 212 to bank 212. Additionally, the read address signal received by the banks 212 may cause the banks 212 not providing data to control the MUX 226 to provide data from an upstream bank 212 to the associated interface D flip flop 228.

In some examples, each bank 212, e.g., 212-1 through 212-K, may direct image data to a respective interface D flip flop 228 of one or more channels 218. Once the local data is latched by the respective interface D flip flop 228, the local data may propagate to a subsequent downstream interface D flip flop 228 via a subsequent pulse of the read clock signal. To move all K banks of image data into the function logic 210, K clock signals may be required.

Figure 3:
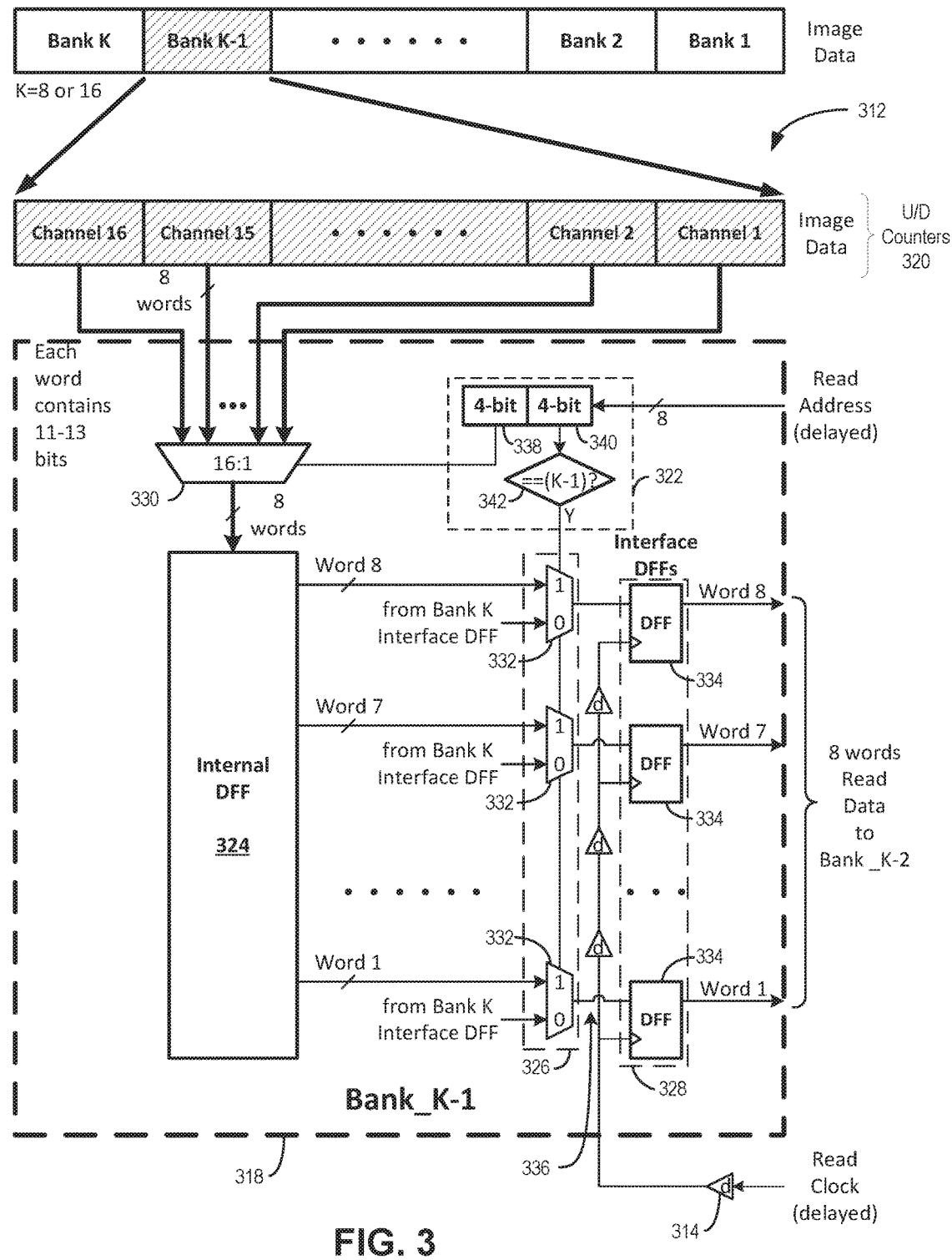
FIG. 3 is a block diagram of a bank 312 in accordance with an embodiment of the present disclosure.

FIG. 3 is a block diagram of a bank 312 in accordance with an embodiment of the present disclosure. The bank 312 may be but one example of a bank 212 of the data transmission circuit 208. The illustrated embodiment of the bank 312 includes an up/down counter 320 and a channel 318, where the bank 312 is bank_K-1 of K banks, as shown at the top of FIG. 3. While only a single channel 318 is shown, the bank 312 may have a plurality of channels 318, such as 8 or 16. The illustrated embodiment of the channel 318 includes a first MUX 330, an internal DFF 324, an address decoder 322, a second MUX 326, a plurality of delays 336, and an interface DFF 328. The illustrated embodiment of the second MUX 326 includes a plurality of 2:1 multiplexers 332, and the illustrated embodiment of the interface DFF 328 includes a plurality of DFFs 334.

The illustrated embodiment of the up/down counter 320 is shown as a block that includes 16 channels, with each channel including eight data words. Of course, the numbers of channels and data words are for example purposes only, and should not be considered limiting to the present disclosure. The up/down counter 320 may be an example of the up/down counter 220, and may receive analog image data from a pixel, or a plurality of pixel and provide digital image data in response. In the embodiment of FIG. 3, the up/down counter 320 may be coupled to receive image data from 16 pixels, hence the 16 channels. The data words may be 11- to 13-bit data words, with 8 to 10 bits used for image data, and the remaining bits used for error correction. The eight data words outputs of the 16 channels of the up/down counter 320 may be coupled to a respective input of the first MUX 330.

The MUX 330 may be a 16:1 multiplexer coupled to provide data words from one of the 16 channels of the up/down counter 320 to the internal DFF 324 in response to a control signal. The control signal may be provided by the address decoder 322, for example. The first MUX 330 may asynchronously provide the 8 data words of the selected channel to the internal DFF 324 in response to the control signal.

The address decoder 322 may receive a read address from a control circuit or function logic, and provide the image data associated with the read address in response. The read address may be delayed a respective amount of delay in accordance with a relation of the bank 312 to the function logic, such as function logic 110 and/or 210. For example, bank_K-1 of FIG. 3 will receive the read address after being delayed by K-1 delays. In some embodiments, the read address may be an eight-bit word, with four bits used to determine a target channel of the up/down counter 320, and the other four bits used to control the second MUX 326. The read address may be decoded by the address decoder 322 to determine which channel to couple to the internal DFF 324 via the first MUX 330, and to further determine how to control the second MUX 326.

The address decoder 322 may include two four-bit decoders 338 and 340, and a logic gate 342. The two four-bit decoders 338 and 340 may decode a different part of the read address and provide a respective control signal in response. For example, the four-bit decoder 338 may determine which of the 16 channels to couple to the internal DFF 324, e.g., how to control the first MUX 330, and the four-bit decoder 340 may determine whether the second MUX 326 couples the output of the internal DFF 324 or the output of a subsequent upstream bank to the interface D flip flop 328. While the logic gate 342 is shown as a flow chart-type decision block in FIG. 3, any type of logic gate may be implemented, such as an OR, AND, XOR, XNOR, etc. The logic gate 342 may receive the output of the four-bit decoder 340 and determine whether the output of the internal DFF 324 is to be coupled to the input of the interface D flip flop 328, e.g., if the output equals the address for that bank 312, e.g., bank_K-1.

The internal DFF 324 may be a latch capable of asynchronously latching data words of a channel coupled through the first MUX 330. In some embodiments, the internal DFF 324 may be formed from a plurality of D flip flops, but other types of latches may also be implemented. In some embodiments, there may be eight data words, but the number of words should not be considered limiting. Outputs of the internal DFF 324 may be provided to inputs of the second MUX 326. In some embodiments, each output of the internal DFF 324 may provide a single data word, which may include eight to 13 bits. Additionally, each output of the internal DFF 324 may be provided to an input of a 2:1 multiplexer 332 forming the second MUX 326.

The illustrated embodiment of the second MUX 326 includes a plurality of 2:1 multiplexers 332 coupled to respective outputs of the internal DFF 324, and further coupled to outputs of a subsequent upstream bank. In some embodiments, the number of 2:1 multiplexers 332 may depend on the number of words provided by each channel of the up/down counter 320. For example, there may be eight 2:1 multiplexers 332. Additionally, each of the plurality of multiplexers 332 may be coupled to receive a control signal form the address decoder 322. The control signal may determine if each of the plurality of multiplexers 332 coupled the output of the internal DFF 324 or the subsequent upstream bank to inputs of the interface D flip flop 328. In some embodiments, the default of the plurality of multiplexers may be to couple the upstream bank to the interface D flip flop 328, and only couple the output of the internal DFF 324 in response to a control signal provided by the address decoder 322.

The interface D flip flop 328 (labeled Interface DFF in FIG. 3) may be coupled to receive data words at a plurality of inputs, latch and provide the same in response to the read clock signal. In some embodiments, the interface D flip flop 328 may be formed from a plurality of D flip flops 334. In general, the number of D flip flops may be commensurate with a number of data words received as inputs. For example, to receive eight data words, there may be eight D flip flops 334. Outputs of the interface D flip flop 328 may be coupled to inputs of a second MUX of a subsequent downstream bank, for example. However, the outputs of the interface D flip flop 328 of a bank_1 may be coupled to an input of a logic function, such as logic function 110/210.

The plurality of delay 336 may further delay the read clock signal, and may be coupled to trigger a respective D flip flop 334. For example, seven delays may be implemented with each of the seven delays coupled between instances of D flip flops 334. By further delaying the read clock signal, each data word from a channel is latched in a cascade-like manner so that each of the D flip flops do not trigger simultaneously. In some embodiments, data word 1 may be latched first followed by data word 2, then data word 3, and so on until all eight data words are latched.

Figure 4:
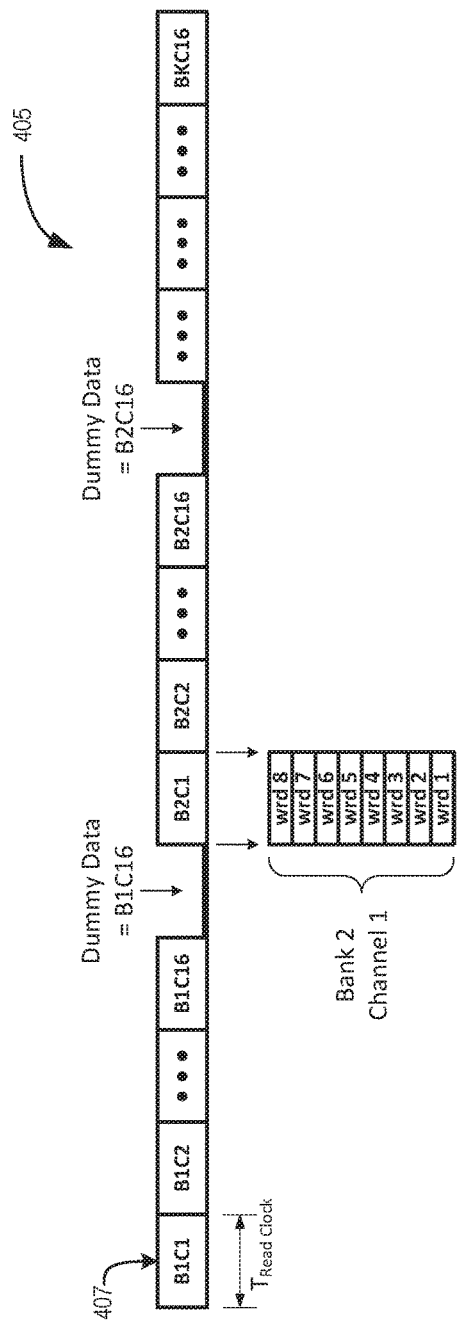
FIG. 4 is an example timing diagram 405 in accordance with an embodiment of the present disclosure.

FIG. 4 is an example timing diagram 405 in accordance with an embodiment of the present disclosure. The timing diagram 405 may represent data movement through the data transmission circuits 106 and/or 206. The timing diagram 405 includes a plurality of data blocks 407, with each data block 407 representing eight data words from a single channel of a single bank. For example, the data block 407 labeled "B1C1," e.g., bank_1 Channel 1, represents 8 data words from channel 1 of Bank_1. Additionally, between each bank a dummy data block may be included. For example, after B1C16, e.g., bank_1 Channel 16, a dummy data block may be included. In some embodiments, the dummy data block may be a replica of the previous data block, such as B1C16. However, any dummy data may be implemented and is contemplated herein. Additionally, the 8 data words forming each data block 407 may have an associated sequence. For example, the 8 data words may be transmitted in order starting with data word 1, then data word 2, and so on.

Function logic and/or control circuitry of an imaging system may receive the data represented in the timing diagram 405. In some embodiments, the data may be received sequentially channel by channel and bank by bank. While the order of the banks may not change from receiving data from bank_1 first then bank_2 and on until bank_K data is received, the order of the channels of each bank may be different. The order of the channel data within each bank data may be provided in response to the read address provided by the digital processor. In general, the sequence of not only the banks, channels within the banks, and data words within each channel may depend on the order of read addresses provided by control circuitry or function logic.

Each data block may take a clock period to be received by the function logic. For example, the clock period may be $T_{Read\ Clock}$, which may be a period of the read clock signal. In some embodiments, the read clock signal may be a derivative of a system clock signal. With reference to FIG. 3, 8 data words of a single channel may be clocked into the digital processor in a single clock period once those eight data words have propagated to the interface DFF 328 of bank_1. However, the number of clock cycles of any given channel needed to clock the 8 data words into the function logic will depend on the bank from which they originate and that bank's relation to the function logic. This may be so since the banks are serially coupled with bank_1 directly coupled to the function logic and the remaining banks a respective number of banks away from the digital processor.

For example, image data from bank_5 may take 5 periods of $T_{Read\ Clock}$ to be received by the function logic, and image data from bank_(K-2) may take (K-2) period of $T_{Read\ Clock}$.

Figure 5:
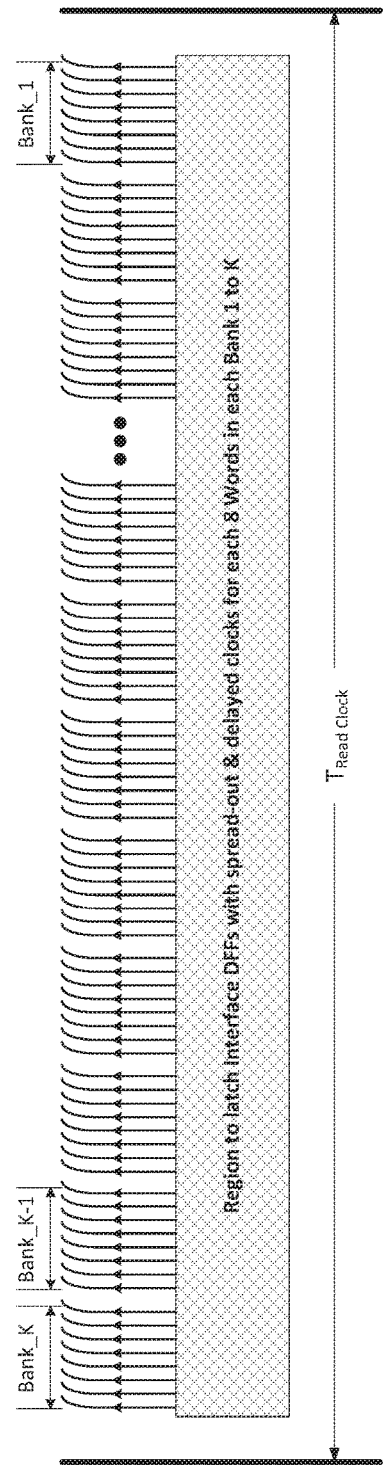
FIG. 5 is an example timing diagram 515 in accordance with an embodiment of the present disclosure.

FIG. 5 is an example timing diagram 515 in accordance with an embodiment of the present disclosure. The timing diagram 515 shows the rising edge of the read clock signal provided to D flip flops 334, for example, to K banks of a data transmission circuit. The read clock signal may be distributed to each bank and to each D flip flop 334 of each bank through delays to spread out the triggering and switching of 8 D flip flops 334 times K banks. Spreading out the triggering and latching may reduce peak current and power, which may result in a reduction in overall power consumption. Additionally, the distributed switching may reduce EMI generation due to a large number of small switching events instead of a large number of switching events simultaneously occurring.

The rising edge of the distributed read clock signal may result in latching of data words by interface DFFs 228/328 of the data transmission circuit. Each arrowed line shown in the timing diagram 515 represents a rising edge of a read clock signal distributed through a data transmission circuit via a plurality of delays. The read clock signal may originate at function logic or control circuitry of an imaging system. In terms of sequence, the read clock signal may be provided to Bank_1 before sequentially propagating to each of the Banks 2 through K through a respective number of delays. Additionally, each rising edge of the read clock signal may be delayed within each bank so that interface DFFs 334 are each triggered sequentially. As a result, there is a cascade of data words latched by respective interface DFFs 334.

Additionally, the timing diagram 515 shows a single read clock period $T_{Read\ Clock}$. In some embodiments, to ensure that each interface D flip flop 328 (including the DFFs 334) of the K banks latches image data within a single clock period, the delay of each delay may be $T_{Read\ Clock}$ divided by (K*8), where 8 represents the number of D flip flops 334 that form an interface D flip flop 328. This is to ensure that all image data of all K banks is latched in a single period of the read clock before the data serially propagates through the data transmission circuit to the function logic.

Figure 6:
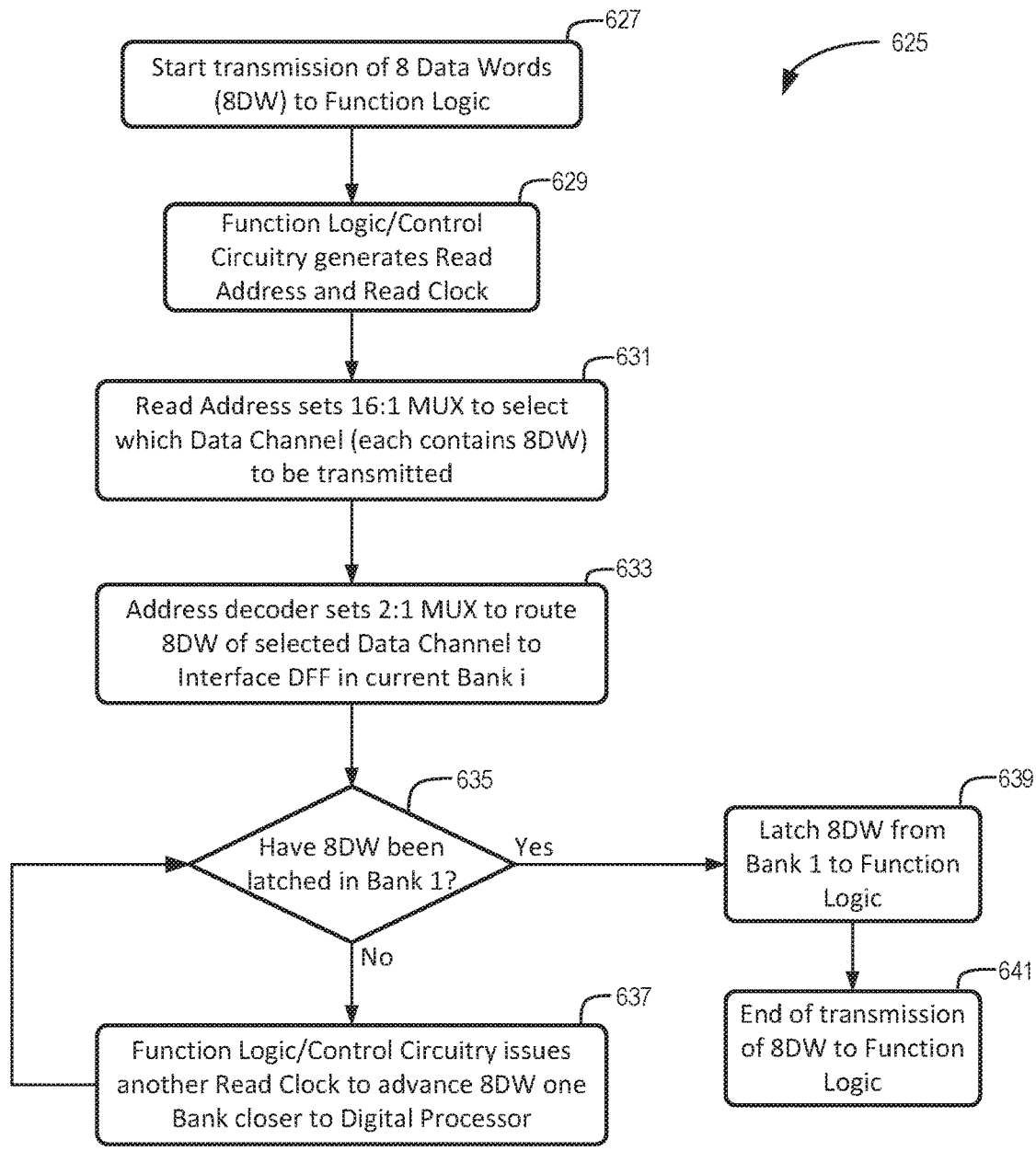
FIG. 6 is an illustrative flow chart 625 in accordance with an embodiment of the present disclosure.

FIG. 6 is an illustrative flow chart 625 in accordance with an embodiment of the present disclosure. The flow chart 625 may illustrate the selection and propagation of eight data words from a channel of a bank to function logic, such as the function logic 110 and/or 210. The flow chart may begin at process block 627, which includes start transmission of eight data words to the function logic.

The process block 627 may be followed by process block 629, which includes the function logic or control circuitry generating read address and read clock signals. The read address signal may be provided to a plurality of banks, such as banks 212, via a read address line, which may include a plurality of delays. The read clock signal may be provided to the plurality of banks via a read clock line, which may also include a plurality of delays. In some embodiments, the read address signal may be provided before the read clock signal to account for any latency associated with a targeted bank to prepare the eight data words to be latched by associated interface DFFs 334.

The process block 629 may be followed by process block 631, which includes setting a 16:1 MUX of the targeted bank to select a desired channel including the eight data words. The read address signal received by the targeted bank may be decoded by an address decoder to select which channel of 16 different channels to couple to an internal DFF 324 via the 16:1 MUX 330. The process block 631 may be followed by process block 633, which includes setting each of a plurality of 2:1 MUXs to route the eight data words from the internal DFF 324 to the interface DFFs 334. After completion of process block 633, the eight data words should be provided to the inputs of the interface DFFs 334 and ready to be latched by the same in response to the read clock signal.

The process block 633 may be followed by process block 635, which determines whether the eight data words have been latched by bank 1. If however, the targeted bank is bank_1, then the outcome is YES, and process block 639 follows. If the targeted bank is not bank_1, then the outcome is NO, and process block 637 follows. Process block 637 includes the digital processor providing an additional read clock signal to move the eight data words to a subsequent bank closer to the digital processor. After the completion of process block 637, then process block 635 is repeated. The process blocks 635 and 637 may be repeated i times, where i designates the targeted bank, and until the eight data words have propagated through the banks of the data transmission circuit until reaching bank_1.

Once the outcome of process block 635 is YES, then process block 639 follows, which includes latching the eight data words into the digital processor. At this time, process block 641 may follow, which includes ending the transmission of the eight data words to the digital processor.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A data transmission circuit of an image sensor, the data transmission circuit comprising:
    a plurality of transmission banks coupled in series with a first one of the plurality of transmission banks coupled to function logic, wherein each of the plurality of transmission banks are coupled to provide image data to a subsequent transmission bank in a direction toward the function logic in response to a clock signal;
    a plurality of delays coupled in series, wherein each of the plurality of delays is associated with and coupled to a respective transmission bank of the plurality of transmission banks, and wherein the clock signal is received by each of the plurality of transmission banks after being delayed by a respective number of delays of the plurality of delays in relation to the function logic; and
    a second plurality of delays coupled in series, wherein each of the second plurality of delays is associated with and coupled to a respective transmission bank of the plurality of transmission banks, and wherein an address signal is provided to each of the plurality of transmission banks after being delayed by a respective number of delays.

2. The data transmission circuit of claim 1, wherein the address signal determines a channel of image data of each transmission bank of the plurality of transmission banks to provide to the function logic.

3. The data transmission circuit of claim 1, wherein the address signal determines a channel of image data of at least one of transmission bank of the plurality of transmission banks to provide to the function logic.

4. The data transmission circuit of claim 1, wherein the clock signal causes image data from at least one transmission bank of the plurality of transmission banks to propagate through intervening transmission banks between the at least one transmission bank and the function logic.

5. The data transmission circuit of claim 1, wherein each transmission bank includes:
   a plurality of analog-to-digital converters (ADCs) coupled to receive analog image data from a respective pixel and convert the analog image data into digital image data;
   an address decoder coupled to receive an address signal and decode the address signal into first and second control signals, wherein the address signal is delayed a number of times respective to the transmission bank;
   a plurality of channels coupled to receive image data from the plurality of ADCs, wherein each channel is coupled to receive the image data from one of the plurality of ADCs through a first multiplexer in response to the first control signal, the first control signal received by the first multiplexer, and
   wherein each of the plurality of channels is to provide the image data to a subsequent transmission bank in the direction of the function logic in response to the second control signal.

6. The data transmission circuit of claim 5, wherein each channel includes:
   an internal latch coupled to receive the image data from the first multiplexer and further coupled to provide the image data;
   a second multiplexer coupled to receive the image data on a first input and further coupled to receive image data from another transmission bank in a direction away from the function logic, and provide either the image data or the image data from the another transmission bank in response to the second control signal; and
   an interface latch coupled to receive an input from the second multiplexer and further coupled to provide an output to a second multiplexer of a channel of a transmission bank in a direction toward the function logic.

7. An imaging system, comprising:
   an array of pixels coupled to receive image light and provide image data in response; and
   readout circuitry coupled to the array of pixel and to receive the image data, and provide the image data to function logic, wherein the readout circuitry includes:
      a plurality of transmission banks coupled in series with a first one of the transmission banks coupled to the function logic, wherein each of the plurality of transmission banks is coupled to receive image data in parallel from a plurality of pixels of the pixel array and provide the image data to the function logic in series in response to a clock signal; and
      a plurality of delays coupled to provide the clock signal to a respective one of the transmission banks.

8. The imaging system of claim 7, wherein there are K transmission banks coupled in series with the Kth transmission bank farthest from the function logic, and wherein there are K delays coupled to provide the clock signal to the K transmission banks, with each transmission bank receiving the clock signal after it has propagated through a commensurate number of delays.

9. The imaging system of claim 7, wherein the readout circuitry further includes a plurality of second delays coupled to provide an address to each of the plurality of transmission banks, wherein each transmission banks receives the address through a commensurate number of second delays, and wherein the address determines the image data to provide to the function logic.

10. The imaging system of claim 7, wherein each transmission bank includes:
    a plurality of analog-to-digital converters (ADCs) to convert the image data from a plurality of pixels into digital image data;
    an address decoder coupled to receive an address and decode the address into first and second control signals;
    a plurality of channels coupled to receive image data from the plurality of ADCs; and
    a first multiplexer coupled to receive the first control signal and provide image data from one of the plurality of ADCs to one of the plurality of channels.

11. The imaging system of claim 10, wherein each of the plurality of channels includes:
    an internal latch coupled to receive the image data from the first multiplexer and further coupled to provide the image data;
    a second multiplexer coupled to receive the image data on a first input and further coupled to receive image data from another transmission bank in a direction away from the function logic, and provide either the image data or the image data from the another transmission bank in response to the second control signal; and
    an interface latch coupled to receive an input from the second multiplexer and further coupled to provide an output to a second multiplexer of a channel of a transmission bank in a direction toward the function logic.

12. The imaging system of claim 9, wherein at least the plurality of transmission banks and the plurality of delays form a data transmission circuit.

13. A method, comprising:
    providing an address signal and a clock signal to a plurality of banks of a data transmission circuit, wherein the plurality of banks are coupled in series with a first one of the plurality of banks coupled to function logic;
    decoding the address signal by each of the plurality of banks to determine which of the plurality of banks is a targeted bank;
    selecting a channel of image data of a plurality of channels of image data by the targeted bank;
    latching the channel of image data by an interface latch of the targeted bank in response to a rising edge of the clock signal, wherein the clock signal is received by the targeted bank after being delayed by a plurality of delays commensurate with the targeted bank; and
    continuing to provide the clock signal to the plurality of banks, wherein each subsequent rising edge of the clock signal causes the channel of image data to propagate to a subsequent bank in the direction toward the function logic.

14. The method of claim 13, wherein latching the channel of image data by the interface latch of the targeted bank provides the channel of image data to a subsequent bank of the plurality of banks, wherein the subsequent bank is in a direction of the function logic.

15. The method of claim 14, further comprising:
receiving a subsequent rising edge of the clock signal at an interface latch of the subsequent bank; and
latching the channel of image data by the interface latch of the subsequent bank in response to the subsequent rising edge of the clock signal.

16. The method of claim 15, wherein the rising edge of the subsequent clock signal received by the subsequent interface latch is delayed less than the rising edge of the clock signal received by the interface latch.

17. The method of claim 13, further comprising:
determining whether the channel of image data has been latched by the function logic;
based on the channel of image data not have yet been latched by the function logic, continuing to provide the clock signal; and
based on the channel of image data being latched by the function logic, ceasing to provide the clock signal.

18. The method of claim 13, wherein decoding the address signal by each of the plurality of banks to determine which of the plurality of banks is a targeted bank further comprises:
controlling a multiplexer to direct the channel of image data to the interface latch by the target bank; and
controlling respective multiplexers of the remaining plurality of banks to direct an output of an interface latch of a bank in a direction away from the function logic to inputs of their respective interface latches.

* * * * *